United States Patent

Gordon

[15] 3,664,966

[45] May 23, 1972

[54] DEHYDROHALOGENATION CATALYST

[72] Inventor: Ronnie D. Gordon, Ponca City, Okla.

[73] Assignee: Continental Oil Company, Ponca City, Okla.

[22] Filed: Feb. 9, 1970

[21] Appl. No.: 9,961

[52] U.S. Cl. .................................252/430, 260/654 D
[51] Int. Cl. ..........................................C07c 21/00
[58] Field of Search ....................252/430; 260/654 D

[56] References Cited

UNITED STATES PATENTS

| | | | |
|---|---|---|---|
| 3,290,398 | 12/1966 | Richtzenhain et al. | 260/654 D |
| 3,413,365 | 11/1968 | Sennewald et al. | 260/654 D |
| 2,879,311 | 3/1959 | Hawkins | 260/654 D |
| 2,361,072 | 10/1944 | Vining | 260/654 D |
| 3,441,548 | 4/1969 | Thelin | 252/430 X |

Primary Examiner—Patrick P. Garvin
Attorney—Joseph C. Kotarski, Henry H. Huth, Robert B. Coleman, Jr., Glen M. Burdick and Carroll Palmer

[57] ABSTRACT

A dehydrohalogenation catalyst and process employing same in the manufacture of halogen unsaturated derivatives from saturated compounds is provided wherein the catalyst comprises from about 99.99 to 90 weight percent of an aqueous base wherein the base constituent is an alkali metal hydroxide or an alkaline earth metal hydroxide and from about 0.01 to about 10 weight percent of an organic quaternary salt compound having the general formula

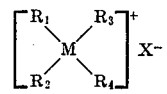

where M is a pentavalent ion of an element selected from the group consisting of nitrogen, phosphorous, and arsenic, $R_1$, $R_2$, $R_3$ and $R_4$ are alkyl radicals containing from one to about 30 carbon atoms, and X is an anion derived from organic and inorganic acids which will disassociate from the cation portion of the organic quaternary salt in an aqueous environment.

5 Claims, No Drawings

DEHYDROHALOGENATION CATALYST

BACKGROUND OF THE INVENTION

1. Field of the Invention

This invention relates to a novel dehydrohalogenation catalyst which contains a major portion of an aqueous base and a minor portion of an organic quaternary salt compound. In one aspect this invention relates to the preparation of halogen unsaturated derivatives from saturated compounds using the novel dehydrohalogenation catalyst. In another aspect this invention relates to the preparation of vinylidene chloride by the dehydrohalogenation of 1,1,2-trichloroethane employing the novel catalyst system of the present invention.

2. Brief Description of the Prior Art

Various processes have been proposed in the past for the production of halogen unsaturated derivatives from saturated compounds. These processes generally known as dehydrohalogenation processes, have been employed to produce valuable chemical intermediates which cannot be readily synthesized by direct methods. Many proposed processes have not proven to be commercially feasible either due to the high temperatures employed or the rate and selectivity of the formation of the desired compounds have been too low. In addition, difficulties arise in the formation of undesired by-products which cannot readily be separated from the desired product. Thus, processes are constantly being sought, as well as are improved dehydrohalogenation catalyst, which would allow one to conduct a dehydrohalogenation process employing low temperatures while, at the same time, providing economical conversion rates of the saturated halogen substituted hydrocarbon compound to the halogen substituted unsaturated compound. Further, in order for such process to be economically feasible one should be able to recover a substantially pure product without the necessity of complex and expensive separation procedures.

OBJECTS OF THE INVENTION

An object of the present invention is to provide a new and improved catalyst system for the production of halogen unsaturated derivatives from saturated compounds.

Another object of the invention is to provide a new catalyst system which increases the reaction rate while allowing the dehydrohalogenation reaction to be conducted at lower temperatures.

Another object of the present invention is to provide an improved catalyst system which does not cause formation of undesirable by-products in the dehydrohalogenation reaction.

Another object of the invention is to provide a new and improved process for the manufacture of halogen unsaturated derivatives from saturated compounds.

Another object of the invention is to provide a new and improved process for the manufacture of vinylidene chloride from 1,1,2-trichloroethane.

These and other objects, advantages, and features of the present invention will become apparent to those skilled in the art from a reading of the following description and appended claims.

SUMMARY OF THE INVENTION

According to the present invention I have found a new catalyst system which overcomes the deficiencies of the catalyst employed by the prior art by allowing the dehydrohalogenation process to be conducted at lower temperatures. Further, I have found that by employing the novel catalyst system of my invention that the reaction rate in the dehydrohalogenation process is improved.

Broadly, the novel dehydrohalogenation catalyst of the present invention contains from about 99.99 to 90 weight percent of an aqueous base and from about 0.01 to about 10 weight percent of an organic quaternary salt having the general formula

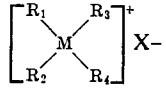

where M is a pentavalent ion of an element selected from the group consisting of nitrogen, phosphorous, and arsenic, $R_1$, $R_2$, $R_3$ and $R_4$ are alkyl radicals containing from one to about 30 carbon atoms, and X is an anion derived from organic and inorganic acids which will disassociate from the cation portion of the organic quaternary salt in an aqueous environment.

Further according to the invention, I have found a process for the manufacture of halogen substituted unsaturated compounds by the dehydrohalogenation of saturated halogen substituted hydrocarbon compounds. Broadly, the process comprises contacting the saturated halogen substituted hydrocarbon with an effective amount of the dehydrohalogenation catalyst which consists of a major portion of the aqueous base and a minor portion of the organic quaternary salt, and heating the reactants formed by admixing the saturated chemical compound with the catalyst to a temperature within the range of about 25° C. upward to the boiling point of the produced unsaturated halohydrocarbon for a period of time effective to allow formation of the halogen substituted unsaturated compound. The halogen substituted unsaturated compound is recovered from the reaction mixture by distillation and the yield and purity of the product are excellent.

DESCRIPTION OF THE PREFERRED EMBODIMENTS

The dehydrohalogenation catalyst of the present invention is a multi-component system which comprises a major portion of an aqueous base and a minor portion of an organic quaternary salt compound. Basically, the dehydrohalogenation catalyst contains from about 99.99 to 90 weight percent of an aqueous base and from about 0.01 to about 10 weight percent of an organic quaternary salt having the general formula

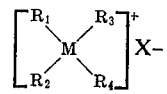

wherein M is a pentavalent ion of an element selected from the group consisting of nitrogen, phosphorous, and arsenic, $R_1$, $R_2$, $R_3$ and $R_4$ are alkyl radicals containing from one to 30 carbon atoms, and X is an anion derived from organic and inorganic acids which will disassociate from the cation portion in an aqueous environment.

The aqueous base constituent of the dehydrohalogenation catalyst is present in an amount of from about 10 to about 50 weight percent based on the total weight of the aqueous base. The base can be any suitable basic material which does not interfere with the dehydrohalogenation process. Such bases are the alkali metal hydroxides and alkaline earth metal hydroxides such as sodium hydroxide, potassium hydroxide, magnesium hydroxide, calcium hydroxide, lithium hydroxide and the like.

Examples of suitable multi-component catalyst systems which can be employed in the preparation of halogen unsaturated derivatives from saturated compounds include 0.01 weight percent methyl tricaprylyl ammonium chloride and 99.99 weight percent aqueous sodium hydroxide, 2.0 weight percent butyl tridodecyl ammonium chloride and 98.0 weight percent aqueous potassium hydroxide, 5.0 weight percent ethyl trioctyl ammonium chloride and 95.0 weight percent aqueous lithium hydroxide, and 10.0 weight percent propyl trioctyldecyl ammonium bromide and 90.0 weight percent aqueous sodium hydroxide.

The term alkyl as used in reference to $R_1$, $R_2$, $R_3$, and $R_4$ in the organic quaternary salt component of the dehydrohalogenation catalyst encompasses alkyl groups containing from one to 30 carbon atoms. Examples of suitable alkyl radicals which can be used are methyl, butyl, pentyl, octyl, dodecyl, pentadecyl, octadecyl, eicosyl, pentacosyl, and tricosyl.

The anion X represented in the above-mentioned formula for the organic quaternary salt constituent of the dehydrohalogenation catalyst of the present invention can by any suitable anion which is derived from organic and inorganic acids which will disassociate from the cation portion in an aqueous solution. Generally, the anion is a halide, a sulfate, a sulfonate, or an acetate. Examples of suitable compounds which can be employed as the anion in the organic quaternary salt constituent are: chloride, bromide, iodide, sulfate, and acetate.

As previously mentioned, the alkyl radicals contained in the cation portion of the organic quaternary salt constituent of the catalyst of the present invention can vary over a wide range from about 1 to about 30. However, especially desirable results have been obtained wherein at least three of the alkyl radicals of the cation portion of said organic quaternary salt contains more than one carbon atom per radical. Furthermore, desirable results have been obtained wherein the pentavalent ion of the cation portion is nitrogen and the anion portion is chloride.

The dehydrohalogenation catalyst described above has been found to increase the reaction rate at lower temperatures in the dehydrohalogenation of halogen substituted saturated hydrocarbons to form halogen substituted unsaturated hydrocarbons. Furthermore, by employing the catalyst in the process for the dehydrohalogenation of a halogen substituted saturated hydrocarbon I have found that it is possible to selectively form the halogen substituted unsaturated component of the halogen substituted saturated hydrocarbon even when the dehydrohalogenation process is carried out in the presence of other chlorinated hydrocarbons. For example, the dehydrohalogenation catalyst may be employed to convert 1,1,2-trichloroethane to 1,1-dichloroethylene in the presence of other chlorinated hydrocarbons such as 1,2-dichloroethane.

The process of the present invention can be employed for the dehydrohalogenation of any suitable halogen substituted saturated hydrocarbon. However, the process has found particular utility in the manufacture of vinylidene chloride by the dehydrochlorination of 1,1,2-trichloroethane. Thus, the process for the manufacture of vinylidene chloride will be discussed in detail.

The reaction of the dehydrochlorination of 1,1,2-trichloroethane is preferably carried out as a liquid phase reaction. While the temperature at which the reaction is conducted can vary broadly generally the temperature ranges from about 25° to about 32° C., the upper limit being the boiling point of the vinylidene chloride formed by the reaction.

In carrying out the process of the present invention the liquid 1,1,2-trichloroethane is introduced into a reactor along with an effective amount of the dehydrohalogenation catalyst. The catalyst which consists of from about 99.99 to 90 weight percent of an aqueous base and from about 0.01 to about 10 weight percent of an organic quaternary salt has been discussed in detail hereinbefore. Therefore, for the sake of simplicity the details containing the catalyst will not be reiterated. The 1,1,2-trichloroethane and the dehydrohalogenation catalyst are then heated to a temperature within the range of about 25° C. to about 32° C. for a period of time effective to allow formation of the vinylidene chloride. The vinylidene chloride is then separated from the reaction mixture by any suitable means such as distillation.

Because one molecule of base is required for the dehydrohalogenation of each 1,1,2-trichloroethane molecule, I have found that it is desirable that the base constituent of the catalyst be present in at least an equal molar ratio based upon the amount of the 1,1,2-trichloroethane initially present. While it is apparent to those skilled in the art that a considerable excess of the base constituent could be employed normally for economical reasons one would employ from 1 to several moles of the base constituent per mole of the 1,1,2-trichloroethane.

The process of the present invention for the production of vinylidene chloride from 1,1,2-trichloroethane can be run as either a batch type reaction or as a continuous type reaction. Even in a batch type reaction it is often desirable to remove the vinylidene chloride as it is formed. Such can really be accomplished when the reaction is carried out at a temperature in excess of about 32° C., which is the boiling point of vinylidene chloride. As is apparent by carrying out the reaction at a temperature in excess of the boiling point of the vinylidene chloride the vinylidene chloride can readily be collected in a condenser and thus separated from the reaction mixture.

As previously stated, the above process has been described in connection with the formation of vinylidene chloride from 1,1,2-trichloroethane. However, it is evident that other suitable dehydrohalogenation reactions can be employed where other suitable halogen substituted saturated hydrocarbons are employed.

In order that those skilled in the art may better understand the present invention and the manner in which it may be practiced, the following examples are given. However, it should be understood that these examples are for illustrative purposes only and are not to be construed as limitations upon the invention.

EXAMPLE I

Identical experiments were run in which catalyst was added to one reaction and not the other in order to determine catalyst activity. Samples were withdrawn from the reaction mixture and analyzed by gas chromatography at various time intervals in order to determine the rate of conversion of 1,1,2-dichloroethane to 1,1-dichloroethylene. The following experiment is used as an illustration.

Two reactions were set up, each containing 13.2 g. (0.1 mole) of 1,1,2-trichloroethane and an aqueous sodium hydroxide solution (4 g. of NaOH dissolved in 20 ml of water). To one of the reactions 0.2 g. of methyl tricaprylyl ammonium chloride was added. The reactions were stirred at ambient temperatures for 20 hours with samples being taken at 1 hour intervals for 2 hours and then at 4-hour intervals.

SAMPLE WITH CATALYST

| Time (hr) | Percent 1,1,2-Trichloroethane | Percent 1,1-Dichloroethylene |
| --- | --- | --- |
| 0 | 100 | 0 |
| 1 | 59 | 41 |
| 2 | 40 | 60 |
| 6 | 12 | 88 |
| 10 | 7 | 93 |

SAMPLE WITHOUT CATALYST

| Time (hr) | Percent 1,1,2-Trichloroethane | Percent 1,1-Dichloroethylene |
| --- | --- | --- |
| 0 | 100 | 0 |
| 1 | 100 | 0 |
| 2 | 100 | 0 |
| 20 | 96 | 4 |

EXAMPLE II

Reaction of 1,1,2-Trichloroethane in the presence of 1,2-Dichloroethane

Samples taken from the heavy ends of a distillation of 1,2-dichloroethane formed from oxychlorination of ethylene were analyzed by gas chromatography and found to contain from 60 to 80 percent 1,1,2-trichloroethane with the major impurity being 1,2-dichloroethane.

Such samples were treated with aqueous sodium hydroxide (50 percent) with and without the quaternary ammonium catalyst. By maintaining the reaction temperature above the boiling point of 1,1-dichloroethylene (32° C.) pure 1,1-dichloroethylene could be distilled from such a mixture if catalyst were present. No vinyl chloride was formed.

Without catalyst at a temperature of 80° C. the formation of 1,1-dichloroethylene was almost nil and of that formed, vinyl chloride was present as an impurity in the distillate in amounts of ca. 5 percent.

1,1-dichloroethylene can be distilled from mixtures of 1,1,2-trichloroethane and 1,2-dichloroethane when trichloroethane was present in amounts as low as 5 percent without contamination due to vinyl chloride.

EXAMPLE III

To illustrate that the catalyst, methyl tricaprylyl ammonium chloride would not cause dehydrohalogenation in the absence of base, 13.2 g. (0.1 mole) of 1,1,2-trichloroethane and 0.5 g. of methyl tricaprylyl ammonium chloride were stirred at 25° C. for 24 hours. Analysis by gas chromatography showed no reaction had occurred. Stirring at 60° C. for 72 hours did not initiate any reaction.

However, upon cooling to 32° C. and adding 0.1 mole of aqueous sodium hydroxide the formation of 1,1-dichloroethylene began almost immediately.

Thus, the above examples clearly indicate the new and improved dehydrohalogenation catalyst and process of the present invention. Further, by examining Examples II and III, it is clear that neither of the components of the catalyst of the present invention suffice as a dehydrohalogenation catalyst under the conditions at which the present process is practiced. Further, the Examples II and III when viewed in conjunction with the Example I disclose a synergistic effect by the combination of the aqueous base and the organic quaternary ammonium salt which, as previously mentioned, when taken separately are not capable of producing the desired vinylidene chloride under the disclosed reaction conditions.

Having thus described the invention, I claim:

1. A dehydrohalogenation catalyst which comprises from about 99.99 to 90 weight percent of an aqueous base wherein said base is selected from the group consisting of alkali metal hydroxides and alkaline earth metal hydroxides and said aqueous base contains from about 10 to about 50 weight percent of said base component, and from about 0.01 to about 10 weight percent of an organic quaternary salt having the general formula

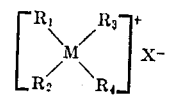

wherein M is a pentavalent ion of an element selected from the group consisting of nitrogen, phosphorous and arsenic, $R_1$, $R_2$, $R_3$ and $R_4$ are alkyl radicals containing from one to about 30 carbon atoms, and X is an anion derived from organic and inorganic acids which will disassociate from the cation

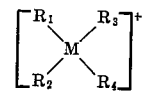

in an aqueous environment.

2. The catalyst of claim 1 wherein said anion is selected from the group consisting of halides, sulfates, sulfonates and acetates.

3. The catalyst of claim 2 wherein at least three of said alkyl radicals contain more than one carbon atom per radical.

4. The catalyst of claim 3 wherein said pentavalent ion is nitrogen and said anion is chloride.

5. The catalyst of claim 4 wherein said aqueous base is about a 50 percent by weight aqueous solution of sodium hydroxide and said organic quaternary salt is methyl tricaprylyl ammonium chloride.

* * * * *